(12) United States Patent
Mochizuki

(10) Patent No.: US 6,625,446 B1
(45) Date of Patent: Sep. 23, 2003

(54) INFORMATION PROCESSOR, METHOD OF INFORMATION PROCESSING AND PROGRAM STORING MEDIUM

(75) Inventor: Toshihiro Mochizuki, Tokyo (JP)

(73) Assignee: Sony Corporation, Tokyo (JP)

( * ) Notice: Subject to any disclaimer, the term of this patent is extended or adjusted under 35 U.S.C. 154(b) by 520 days.

(21) Appl. No.: 09/688,563

(22) Filed: Oct. 16, 2000

(30) Foreign Application Priority Data

Oct. 25, 1999 (JP) .......................................... P11-303153

(51) Int. Cl.$^7$ .......................... H04M 11/00; H04Q 7/20
(52) U.S. Cl. ..................... 455/421; 455/226.4; 455/566; 455/557; 455/556; 455/227
(58) Field of Search .................... 455/421, 566, 455/226.1, 226.4, 556, 557, 575, 412, 418, 227

(56) References Cited

U.S. PATENT DOCUMENTS

| | | | |
|---|---|---|---|
| 5,689,813 A | * | 11/1997 | Seki .......................... 455/67.7 |
| 5,907,815 A | * | 5/1999 | Grimm et al. .............. 455/557 |
| 6,219,540 B1 | * | 4/2001 | Besharat et al. ............. 455/421 |
| 6,243,568 B1 | * | 6/2001 | Detlef et al. .............. 455/226.4 |
| 6,295,460 B1 | * | 9/2001 | Nagel et al. ................. 455/557 |

* cited by examiner

*Primary Examiner*—Lee Nguyen
*Assistant Examiner*—Marceau Milord
(74) *Attorney, Agent, or Firm*—Oblon, Spivak, McClelland, Maier & Neustadt, PC

(57) ABSTRACT

An information processor, a method of information processing and a program storing medium that ensure radio data communication by further accurately showing wave condition to a user. A field intensity level showing screen to be displayed in plural levels that is finer than a portable communication terminal unit is generated based on a field intensity signal showing the field intensity level of the portable communication terminal unit that will be supplied via connecting means connected to the portable communication terminal unit, and the above field intensity level showing screen is displayed on display means. Thereby, the user can further correctly recognize the communicating condition of the portable communication terminal unit. Thus, if the user performs data communication when the wave condition is stable, the data communication can be surely executed in the stable communication environment in which the line is never disconnected.

9 Claims, 9 Drawing Sheets

90 FIELD INTENSITY LEVEL SHOWING SCREEN

THE PRESENT FIELD INTENSITY LEVEL IS

INFORMATION PROCESSOR, METHOD OF INFORMATION PROCESSING AND PROGRAM STORING MEDIUM

BACKGROUND OF THE INVENTION

1. Field of the Invention

The present invention relates to an information processor, a method of information processing and a program storing medium, and more particularly, is suitably applied, for example, to a notebook-sized personal computer (hereinafter, this is referred to as notebook computer).

2. Description of the Related Art

Hitherto, in a notebook computer, data communication has been generally performed by radio waves via for example a cellular phone connected to a modem. Desired information can be easily and instantaneously received in any place.

When data communication via a cellular phone as above is performed, sometimes the field intensity of received radio wave remarkably deteriorates due to the change of the condition of a transmitting line in the middle of the radio data communication via the cellular phone.

If the line on the cellular phone is disconnected owing to such deterioration of the field intensity, the data communication by the notebook computer is interrupted halfway. Therefore, the user has to be careful to perform the data communication after confirming that the field intensity displayed on the display part of the cellular phone is a prescribed level and over and stable.

However, field intensity levels to be displayed on the display of cellular phones are in four levels: a display of "out of area" showing that it is out of the communication area by radio waves, and displays by "bar" in three levels "low", "middle" and "high" showing a receiving level "within the area". Practically, even if the user would perform data communication after confirming for example displayed two or more pieces of "bars" (that is, the receiving level is "middle" and over) in the three levels of display by "bar", the field intensity level is not practically stable. Thus, sometimes the line on the cellular phone was suddenly disconnected and the data communication was interrupted.

As the above, when data communication is performed by a notebook computer using a cellular phone, even if the field intensity level displayed on the display of the cellular phone is showing "within the area", it was only displayed to a user by "bar" in the three levels. Therefore, there has been a problem that the communication condition cannot be accurately shown to the user.

SUMMARY OF THE INVENTION

In view of the foregoing, an object of this invention is to provide an information processor, a method of information processing and a program storing medium that can surely execute radio data communication by further accurately showing the wave condition to a user.

The foregoing object and other objects of the invention have been achieved by the provision of an information processor, a method of information processing and a program storing medium, in which a field intensity level showing screen to be displayed in plural levels that is finer than a portable communication terminal unit is generated based on a field intensity signal showing the field intensity level of the portable communication terminal unit to be supplied via connecting means connected to the portable communication terminal unit, and the above field intensity level showing screen is displayed on display means. Thereby, a user can further correctly recognize the wave condition of the portable communication terminal unit. Thus, if the user performs data communication when the wave condition is stable, the data communication can be surely executed in a stable communication environment in which the line is never disconnected.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 7 is a schematic diagram showing a field intensity level showing screen;

DETAILED DESCRIPTION OF THE EMBODIMENT

Preferred embodiments of this invention will be described with reference to the accompanying drawings:

(1) General Configuration of Notebook-sized Personal Computer

Figure 1:
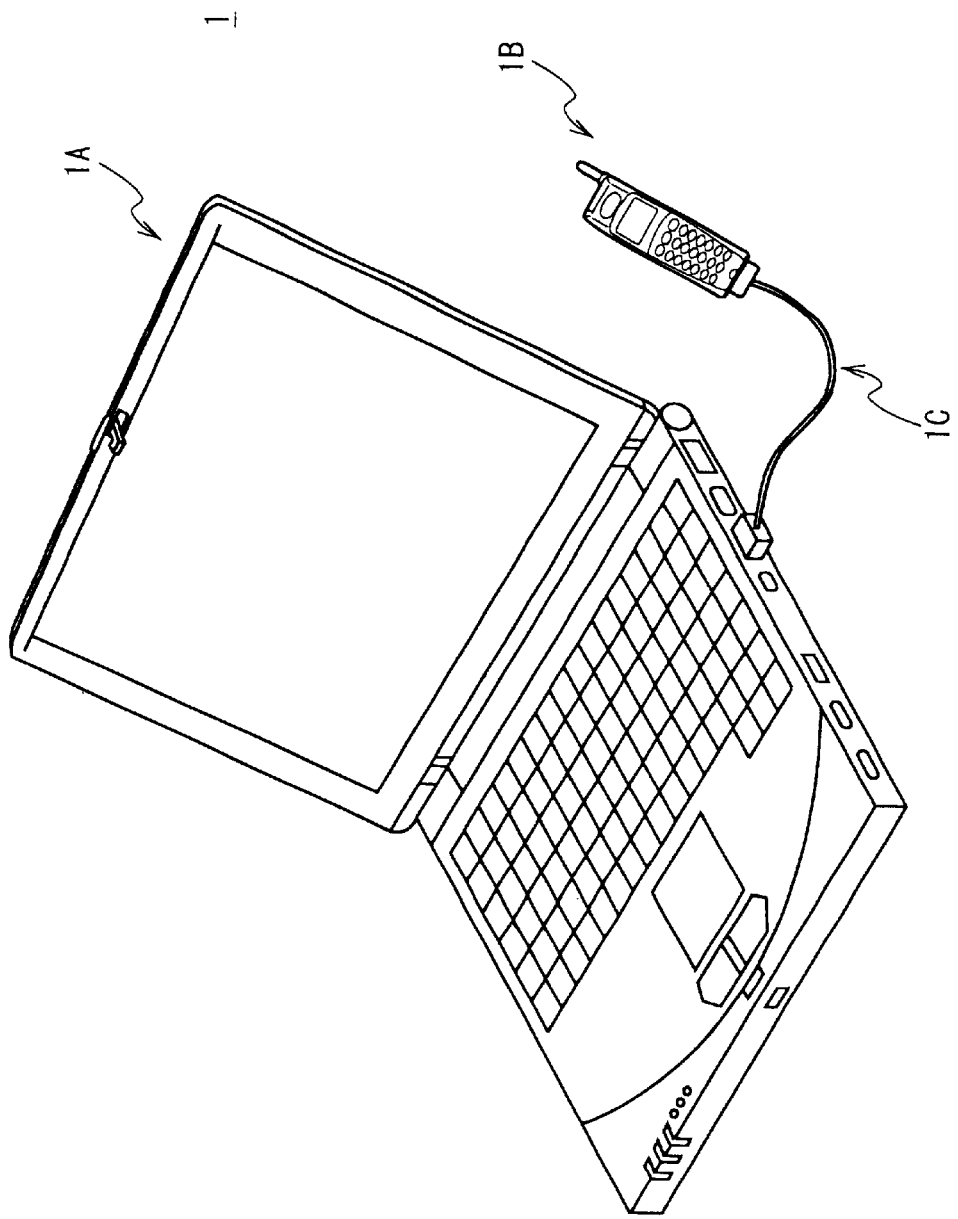
FIG. 1 is a schematic diagram showing the general configuration of a notebook-sized personal computer according to the present invention.

Referring to FIG. 1, 1 generally shows a notebook-sized personal computer (hereinafter, this is referred to as notebook computer). The main body of the notebook computer 1A is connected to a cellular phone 1B by a connecting cable 1C.

(2) General Configuration of Digital Cellular Phone

Figure 2:
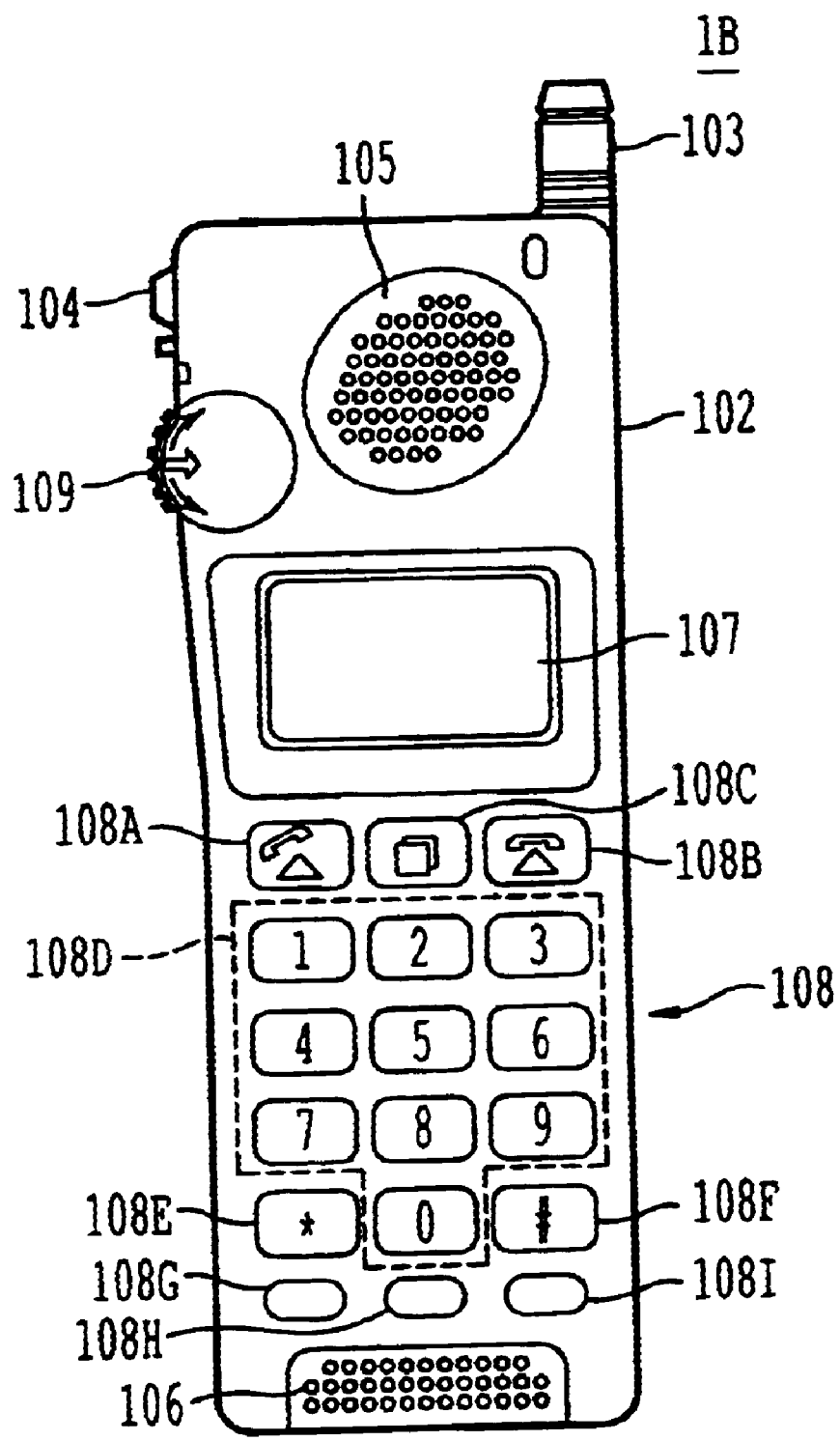
FIG. 2 is a schematic diagram showing the general configuration of a digital cellular phone.

FIG. 2 shows the digital cellular phone 1B in which various members have been fitted to a body case 102 made of a synthetic resin material. In this digital cellular phone 1B, an antenna for transmitting/receiving 103 has been fitted to the top end of the body case 102 in a state where it can be pulled out and housed, and radio waves will be transmitted/received via the above antenna 103 with a base station.

On one side face of the body case 102, a power switch 104 has been provided. By turning on this power switch 104, power is supplied from a battery pack (not shown) fitted on the rear side of the body case 102 to various electric circuits, so that the digital cellular phone 1B is started into a state operable as a cellular phone.

At the upper part of the front side of the body case 102, a speaker 105 has been provided. On talking, the voice of the other party will be given out from the speaker 105. On the other hand, at the lower part of the front side of the body case 102, a microphone 106 has been provided. On talking, user's voice will be picked up from this microphone 106.

In the center of the front side of the body case 102, a liquid crystal display (LCD) 107 has been provided as display means. On the LCD 107, various information such as wave receiving condition, battery capacity, a telephone number when in calling, telephone numbers registered as a telephone directory and the names of the parties, information on originating history, information on various registration content, etc can be displayed.

At the lower part of the front side of the body case 102, various operation keys 108 have been provided. Various commands can be entered using these operation keys 108. In this case, concretely, the following nine kinds of keys have been provided as the operation keys 108: "call originate" key 108A, "hang up" key 108B, "redial" key 108C, numeral keys "0" to "9" 108D, "*" key 108E, "#" key 108F, "memory" key 108G, "clear" key 108H and "call" key 108I.

To those operation keys 108, each function has been assigned as follows. To the "call originate" key 108A, a function to enter a call originating command to perform call originating processing is performed to an entered telephone number, a telephone number selected from the telephone directory list, or a telephone number selected from the call originating history, has been assigned.

To the "hang up" key 108B, a function to enter a command to finish a call, and also a function to enter a command to finish various operation modes have been assigned. To the "redial" key 108C, a function to enter a command to read the call originating history in which the telephone number of the past other party including the date will be displayed has been assigned.

To the ten numerical keys 108D, a function to enter numerical information respectively corresponding has been assigned. To the "*" key 108E, a function to enter the symbol "*(asterisk)" has been assigned. To the "#" key 108F, a function to enter the symbol "#" has been assigned.

To the "memory" key 108G, a function to enter a register command or the like when a telephone number is registered in the telephone directory has been assigned. To the "clear" key 108H, a function to enter a command to clear the displayed content or the registered content has been assigned. To the "call" key 108I, a function to enter a command to display a telephone number registered in the telephone directory has been assigned.

Furthermore, at the upper part of one side face of the body case 102, a jog dial 109 has been provided. By rotationally operating this jog dial 109, various display items such as the call originating history list or the telephone directory list displayed on the liquid crystal display 107 can be displayed in scroll.

In the digital cellular phone 1B, by pressing the jog dial 109 in the inside direction of the body case 102, an item being displayed can be determined. The jog dial 109 can be pressed also into the depth direction along the side face of the body case 102 (into the vertical direction to this drawing FIG. 2). And by rotationally operating the above jog dial 109 while pressing into the depth direction, the item being displayed can be displayed in scroll in another amount of movement.

Note that, to that pressing operation of the jog dial 109 into the inside direction, also a function to enter a command to originate a call similarly to the "call originate" key 108A and a function as a function key have been assigned. Moreover, in this digital cellular phone 1B, also a desired character can be entered by operating this jog dial 109, for example when the telephone directory list is formed or the like.

(3) Circuitry of Digital Cellular Phone

Figure 3:
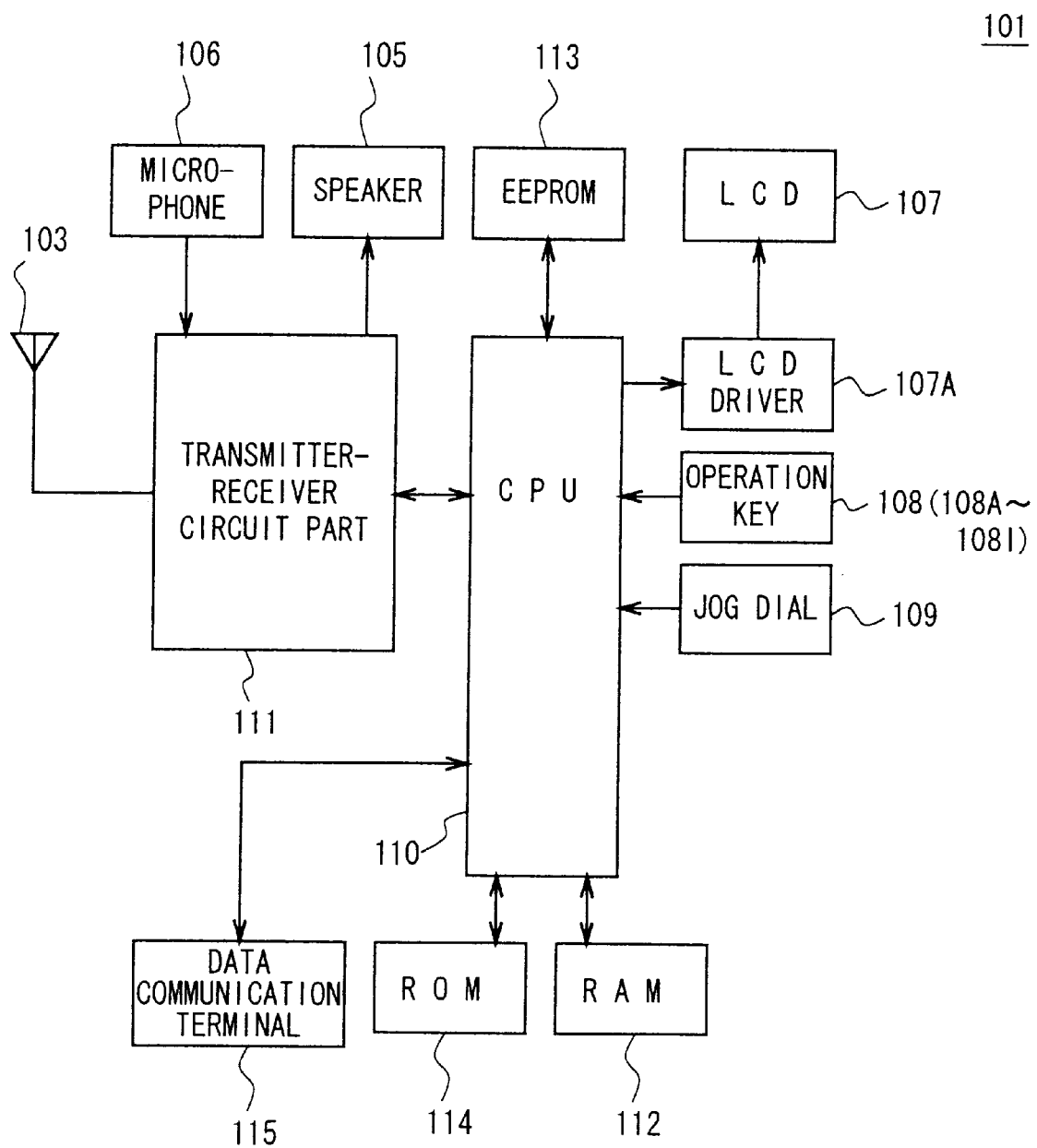
FIG. 3 is a block diagram showing the circuitry of the digital cellular phone.

Here, the circuitry of this digital cellular phone 1B will be described with reference to FIG. 3. In the body case 102 of this cellular phone 1B, the command information entered from the aforementioned various operation keys 108 or the jog dial 109 is first transmitted to a central processing unit (CPU) 110.

The CPU 110 controls an LCD driver circuit 107A based on the supplied command information to display various information according to the command information (e.g. a telephone number to be entered, a menu item, the call originating history or the telephone directory) on the liquid crystal display 107.

The CPU 110 controls a transmitting/receiving circuit part 111 based on the supplied command information to execute various processing according to the command information, such as call originating processing, hang-up processing, etc. Furthermore, the CPU 110 accesses to a random access memory (RAM) 112 and storing specified information, or accesses to an electrically erasable and programmable read only memory (EEPROM) 113 and storing various information such as the call originating history, the telephone directory list, etc. that are wanted to remain even if the power is shut off.

Moreover, the CPU 110 transmits the command information entered from the operation keys 108 or the jog dial 109 to the main body of notebook computer 1A via a data communication terminal 115 and the connecting cable 1C (FIG. 1), or transmits a field intensity signal S1B for representing the wave receiving condition from the base station as the field intensity level in 16 levels to the main body of notebook computer 1A via the data communication terminal 115 and the connecting cable 1C. In this connection, the CPU 110 performs the aforementioned control operation based on a program code stored in a read only memory (ROM) 114.

Here, the field intensity signal S1B is a signal standardized so as to be transmitted when being in an awaiting state that data communication is not performed. The signal will be transmitted as 8-bit digital data divided into 16 levels: the display "out of area" showing that it is out of the communicable area, and the display by "bar" in 15 levels showing a field intensity level "within area".

The transmitting/receiving circuit part 111 transmits a control signal via the antenna 103 by the control of the CPU 110 and performing the call originating processing, or receives a call incoming signal from the base station via the antenna 103 and informing a call incoming to the CPU 110.

Furthermore, the transmitting/receiving circuit part 111 also will perform predetermined signal processing on a voice signal to be entered from the microphone 106 on talking and transmitting this, or performs predetermined signal processing on a receiving signal and demodulating the voice signal and transmitting this to the speaker 105.

(4) General Configuration of Main Body of Notebook-sized Personal Computer

Figure 4:
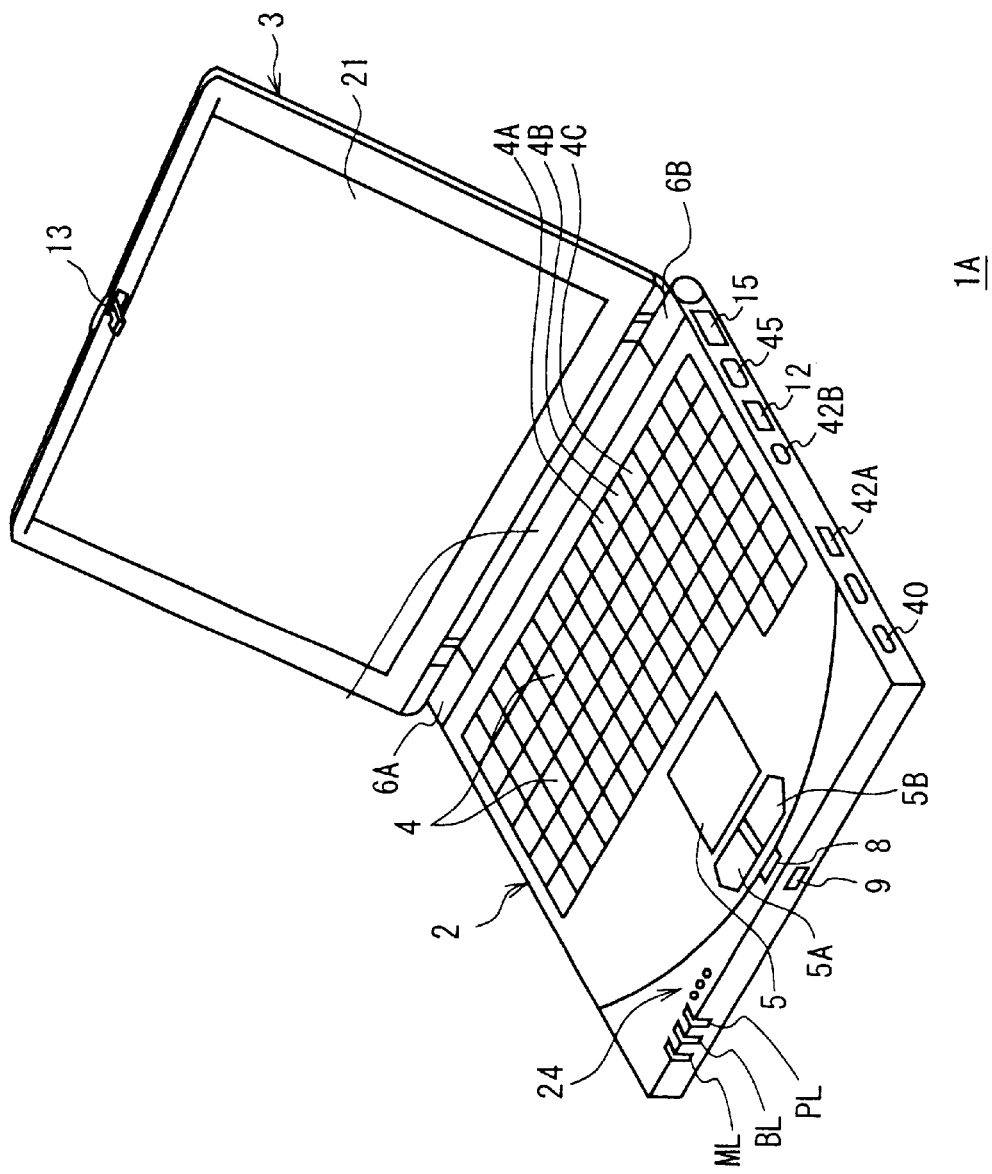
FIG. 4 is a schematic diagram showing the configuration of the main body of the notebook-sized personal computer.

FIG. 4 shows the main body of notebook computer 1A forming an information processing system to which the present invention has been applied. The main body of notebook computer 1A is composed of a main body part 2 and a display part 3 which has been fitted to the above main body part 2 so as to be freely opened and closed.

On the top surface of the main body part 2, plural operation keys 4 to enter various letters, symbols, numerals, etc., a touch pad 5 to be used for moving a mouse cursor, a left click button 5A and a right click button 5B which correspond to a left button and a right button in a general mouse, and built-in speakers 6A and 6B have been provided.

On the front face of the display part 3, a liquid crystal display (LCD) 21 has been provided.

Furthermore, in the display part 3, a pawl 13 has been provided, and also a recessed part 8 has been provided at the prescribed position corresponding to the above pawl 13 of the main body part 2. The pawl 13 will be engaged with the recessed part 8 in the state where the display part 3 is closed to the main body part 2 and locked.

On the front side face of the main body part 2, a slide lever 9 has been provided. By sliding the above slide lever 9, the lock of the pawl 13 engaged with the recessed part 8 is released, and the display part 3 can be opened to the main body part 2.

Furthermore, in the main body part 2, a power lamp PL, a battery lamp BL and a message lamp ML formed by light emitting diodes (LEDs) have been provided side by side. The power lamp PL is turned on when the power is turned on. The battery lamp BL informs the user the remaining amount of a battery in a battery pack (not shown) provided at one rear side face of the main body part 2, by the turning state (that is, continuously turning on, or turning on and off).

The message lamp ML is turned on when a specified application is started, to inform the user the startup of the application. Near the power lamp PL, the battery lamp BL and the message lamp ML, a microphone 24 has been provided.

On the right side face of the main body part 2, a power switch 40, universal serial bus (USB) terminals 42A and 42B, a communication terminal 12 for connecting the digital cellular phone 1B, an infrared communication port for infrared data communication 45 and a modem terminal for modular jack 15 have been provided.

Here, the communication terminal 12 is a connector which can directly connect the digital cellular phone 1B by the dedicated connecting cable 1C being a serial interface without monopolizing a personal computer (PC) card slot, and which can easily connect the main body part 2 to the digital cellular phone 1B.

Figure 5:
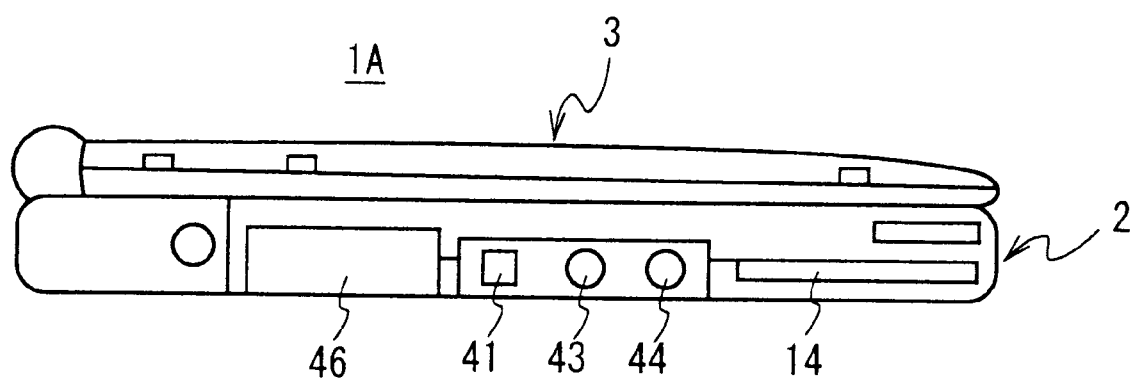
FIG. 5 is a schematic diagram showing the configuration of the left side face of the main body of the notebook-sized personal computer.

As shown in FIG. 5, on the left side face of the main body part 2, a PC card slot 14 for inserting a personal computer memory card international association (PCMCIA) card (the so-called personal computer (PC) card), a headphone terminal 44, an input terminal for microphone 43, an institute of electrical and electronics engineers (IEEE) 1394 terminal 41 corresponding to a 4-pin connector, and a connector for external display 46 have been provided.

(5) Circuitry of Main Body of Notebook Computer 1A

Figure 6:
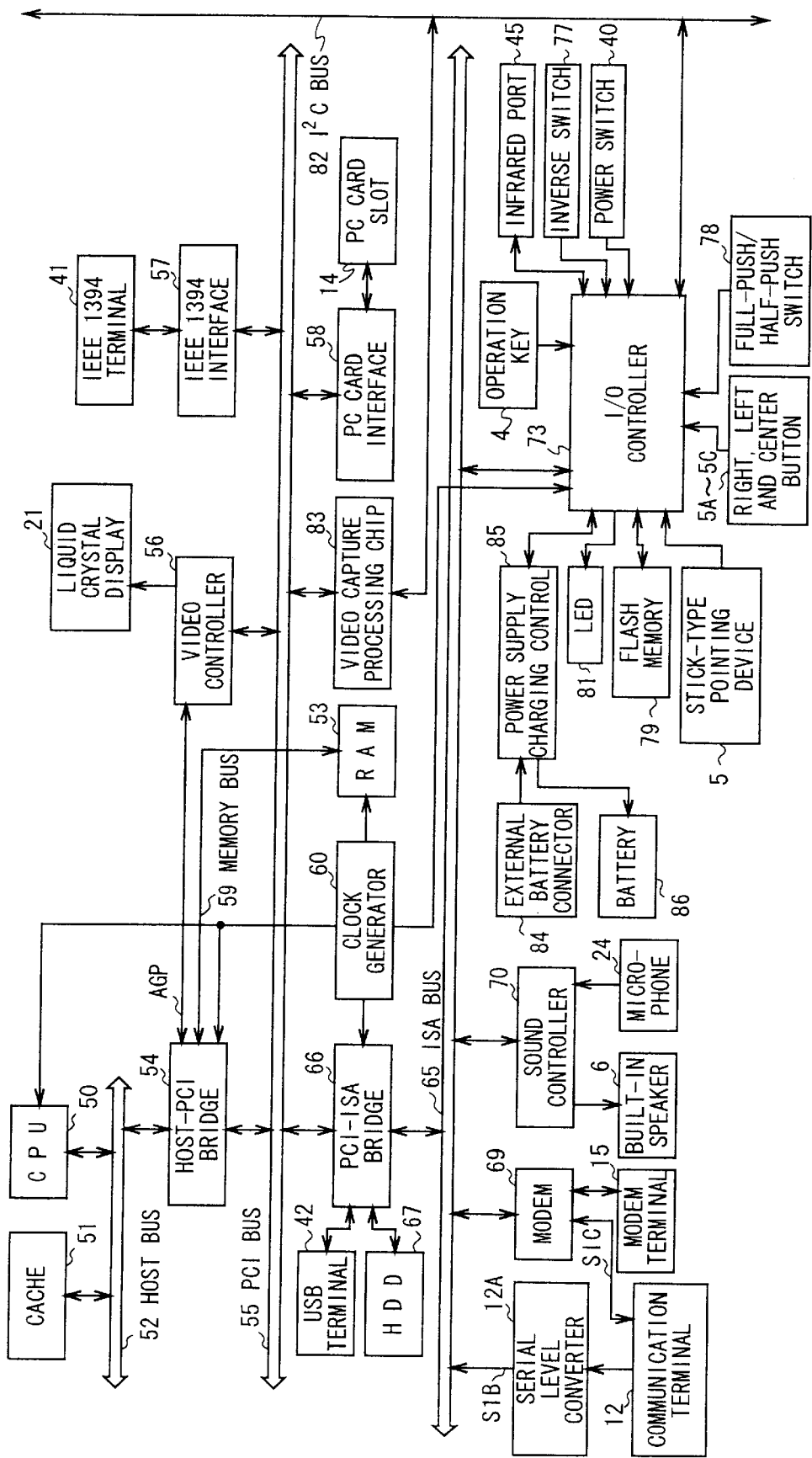
FIG. 6 is a block diagram showing the circuitry of the main body of the notebook-sized personal computer.

As shown in FIG. 6, in the main body of notebook computer 1A, a central processing unit (CPU) 50 for controlling in integration various functions in the above main body of notebook computer 1A has been connected to a host bus 52. The various functions can be realized by executing processing corresponding to various programs or application software, loaded down in a random access memory (RAM) 53 by the above CPU 50 at a specified operating speed based on a system clock to be given from a clock generator 60.

To the host bus 52, a cache memory 51 has been connected, so that data to be used by the CPU 50 will be cached and quick access can be realized.

This host bus 52 has been connected via a peripheral component interconnect (PCI) bus 55 and a host-PCI bridge 54. To the above PCI bus 55, a video controller 56, an IEEE 1394 interface 57, a video capture processing chip 83 and a PC card interface 58 have been connected.

Here, the host-PCI bridge 54 controls the transmitting/receiving of various data between the CPU 50, and the video controller 56, the video capture processing chip 83, the IEEE 1394 interface 57 and the PC card interface 58, and at the same time, it performs the memory control of the RAM 53 connected via a memory bus 59.

Furthermore, the host-PCI bridge 54 has been connected to the video controller 56 via a signal line along an accelerated graphics port (AGP). Thereby, image data can be transferred at high speed between the host-PCI bridge 54 and the video controller 56.

The video controller 56 performs predetermined graphics processing on Joint Photographic Experts Group (JPEG) image data in the video capture processing chip 83. Thereafter, the data is stored in a built-in video random access memory (VRAM), to be suitably read out and supplied and displayed on the liquid crystal display 21.

Furthermore, the video controller 56 will supply image data based on various application software to be timely supplied, to the liquid crystal display 21. Thereby, plural window screens can be simultaneously displayed on the above liquid crystal display 21.

The PC card interface 58 can be suitably mounted via a PC card when an optional function is added. It can be connected to an external device such as a CD-ROM drive, a DVD drive, etc via the PC card.

The IEEE 1394 interface 57 has been directly connected to the IEEE 1394 terminal 41. It can be connected to an external device such as another computer unit, a digital video camera, etc. via the above IEEE 1394 terminal 41.

The PCI bus 55 has been connected to an Industrial Standard Architecture (ISA) bus 65 via a PCI-ISA bridge 66. To the above PCI-ISA bridge 66, an HDD 67 and a Universal Serial Bus (USB) terminal 42 have been connected.

Here, the PCI-ISA bridge 66 is composed of an Integrated Drive Electronics (IDE) interface, a configuration register, a real-time clock (RTC) circuit, a USB interface, etc. The PCI-ISA bridge 66 will control the HDD 67 based on a system clock to be supplied from the clock generator 60 via the IDE interface.

In the HDD 67, an operating system (OS) such as Windows 98 (trademark), an electronic mail program, an auto pilot program, a jog dial utility program, a jog dial driver, a digital map software, and also various application software other than that have been stored. They will be suitably transferred to the RAM 53 in the process of startup processing.

Furthermore, the PCI-ISA bridge 66 controls an external device such as a floppy disk drive, a printer, a USB mouse, etc., not shown, that will be connected via the USB terminal 42, via a USB interface, and at the same time, it controls a modem 69 and a sound controller 70 connected to the ISA bus 65.

The modem 69 connects the computer to an internet service provider (hereinafter, this is referred to as provider)

from the modem terminal 15 via a public telephone circuit and Internet not shown, to access to the above provider. The sound controller 70 performs fetching a voice signal from the microphone 24 and supplying to the built-in speakers 6A and 6B.

To the ISA bus 65, an input/output (I/O) controller 73 has been connected. When power supply is received from an external power connector 84 via a power supply/battery charging control circuit 85 and the power switch 40 is turned on, the I/O controller 73 supplies the power to each circuit. Note that, also here, the I/O controller 73 operates based on the system clock to be supplied from the clock generator 60.

The power supply/battery charging control circuit 85 will be controlled by the I/O controller 73, and will control the battery charging of a battery pack 86.

The I/O controller 73 is composed of a micro-controller, an I/O interface, a CPU, a ROM, a RAM, etc. The I/O controller 73 controls data input/output between the OS, the application software and various peripheral equipment such as the liquid crystal display 21, the HDD 67, etc, based on a basic input/output system (BIOS) stored in a flash memory 79.

Furthermore, the I/O controller 73 has been connected to the infrared port 45. For example, infrared communication with another computer device can be executed. Moreover, the I/O controller 73 has been:sequentially connected to a serial level converter 12A and the communication terminal 12 via the ISA bus 65.

Therefore, the field intensity signal S1B to be supplied from the digital cellular phone 1B via the connecting cable 1C and the communication terminal 12 will be converted into a prescribed voltage level in the serial level converter 12A, and then informed the I/O controller 73 via the ISA bus 65.

By the way, in the ROM of the I/O controller 73, a wake-up program, a key input monitoring program, an LED control program, the field intensity signal storing program for storing the field intensity signal S1B supplied from the digital cellular phone 1B, and various control programs other than that have been stored.

The wake-up program is a program which has been controlled so that if the present time being supplied from an RTC circuit in the PCI-ISA bridge 66 becomes a starting time previously set, the CPU 50 executes specified processing. The key input monitoring program is a program to monitor inputs from the operation keys 4 and the various key switches other than that.

The LED control program is a program to control the turning on of the various lamps formed by the light emitting diodes (LEDs) such as the power lamp PL, the battery lamp BL and the message lamp ML.

In the RAM of the I/O controller 73, a set time register for the wake-up program, a key input monitoring register for the key input monitoring program, an LED control register for the LED control program, a field intensity signal storing register for the field intensity signal storing program, and registers for other various programs have been provided.

The set time register will store time information on a starting time previously and arbitrary set by the user to be used in the wake-up program. The I/O controller 73 determines whether or not the present time being supplied from the RTC circuit becomes the starting time arbitrary set based on the wake-up program, and if it becomes the starting time, the I/O controller 73 informs the CPU 50 that. Thus, the CPU 50 starts a specified application software previously set when the starting time comes, and executes specified processing according to the above application software.

The key input monitoring register will store an operation key flag based on inputs by the operation keys 4, the touch pad 5, the left click button 5A and the right click button 5B.

The I/O controller 73 determines for example whether or not scroll operation by the touch pad 5 or the click operation of the left click button 5A and the right click button 5B has operated based on the state of the operation key flag according to the key input monitoring program. And if the scroll operation or the click operation is performed, the I/O controller 73 informs the CPU 50 that. Thus, the CPU 50 executes prescribed processing corresponding to the movement of the mouse cursor by the scroll operation or the click operation.

The LED control register will store a lamp flag showing the state of turning on/off of the various lamps formed by the LEDs such as the power lamp PL, the battery lamp BL and the message lamp ML.

If the CPU 50 reads the electronic mail program from the HDD 67 for example by the press operation of the operation key 4 and starting it on the RAM 53, and receiving an electronic mail according to the above electronic mail program, the I/O controller 73 stores a lamp flag, and controlling the LED 81 based on the above lamp flag and turning on the message lamp ML.

The field intensity signal storing register for the field intensity signal storing program will sequentially store the field intensity signal S1B in 16 levels to be supplied from the digital cellular phone 1B.

The I/O controller 73 converts the field intensity signal S1B into numerical data S1BB showing the field intensity level of the wave (for example, if the level is "out of area", it is converted into "0", if the field intensity level "within area" is lowest, it is converted into "1", and if the level is maximum, it is converted into "15"), and sequentially informing the CPU 50 this, based on the field intensity signal S1B stored in the field intensity signal storing register.

The CPU 50 reads a field intensity display program from the HDD 67 and staring on the RAM 53, generating the prescribed field intensity level showing screen based on the numeral data S1BB showing the field intensity level according to the above field intensity display program, and displaying this on the liquid crystal display 21 as display means via the video controller 56.

As a result, as shown in FIG. 7, on the liquid crystal display 21, a field intensity level showing screen 90 is displayed. The receiving level of the wave will be shown to the user in the 16 levels including "out of area" and "within area" for example as "The present field intensity level is 9." In this connection, in case of "out of area", a field intensity level showing screen in which a comment content such as "out of area" is displayed will be displayed.

Note that, in the present invention, the field intensity level "within area" will be displayed by the numerals "1" to "15" by dividing into 15 levels. Therefore, the field intensity level can be shown to the user with the precision of five times, comparing to the conventional display of field intensity levels in three levels (in case of "within area") to be displayed on the liquid crystal display 107 of the digital cellular phone 1B.

Thereby, the user can correctly detects an area superior in communicating condition when data communication is performed via the digital cellular phone 1B while referring to the field intensity level displayed with high precision. Thus, after moving to the area superior in communicating condition, the user can execute sure data communication in a condition that the line is never disconnected.

By the way, the CPU 50 as the field intensity level showing screen generating means generates the field intensity level showing screen 90 based on the numeral data 1BB showing the field intensity level informed from the I/O controller 73. And at the same time, when the field intensity level corresponding to the numeral data 1BB is the prescribed value and over and it has been continued for a prescribed period of time or more, the CPU 50 supplies a line connect command S1C against the digital cellular phone 1B to the digital cellular phone 1B via the modem 69, the communication terminal 12 and the connecting cable 1C, according to a line connecting program started on the RAM 53.

Thereby, even if for example the field intensity level of the received wave in the digital cellular phone 1B has instantaneously attenuated owing to some cause and the line has disconnected, if the field intensity level based on the numeral data 1BB informed from the I/O controller 73 is the prescribed value and over and the prescribed period of time or more has been continued, the CPU 50 recognizes that the receiving condition of the wave became well and returned to a communication environment that data communication is possible, and reconnecting the line via the digital cellular phone 1B according to the line connecting program.

(6) Data Communication Processing Procedure according to Field Intensity Level

Figure 8:
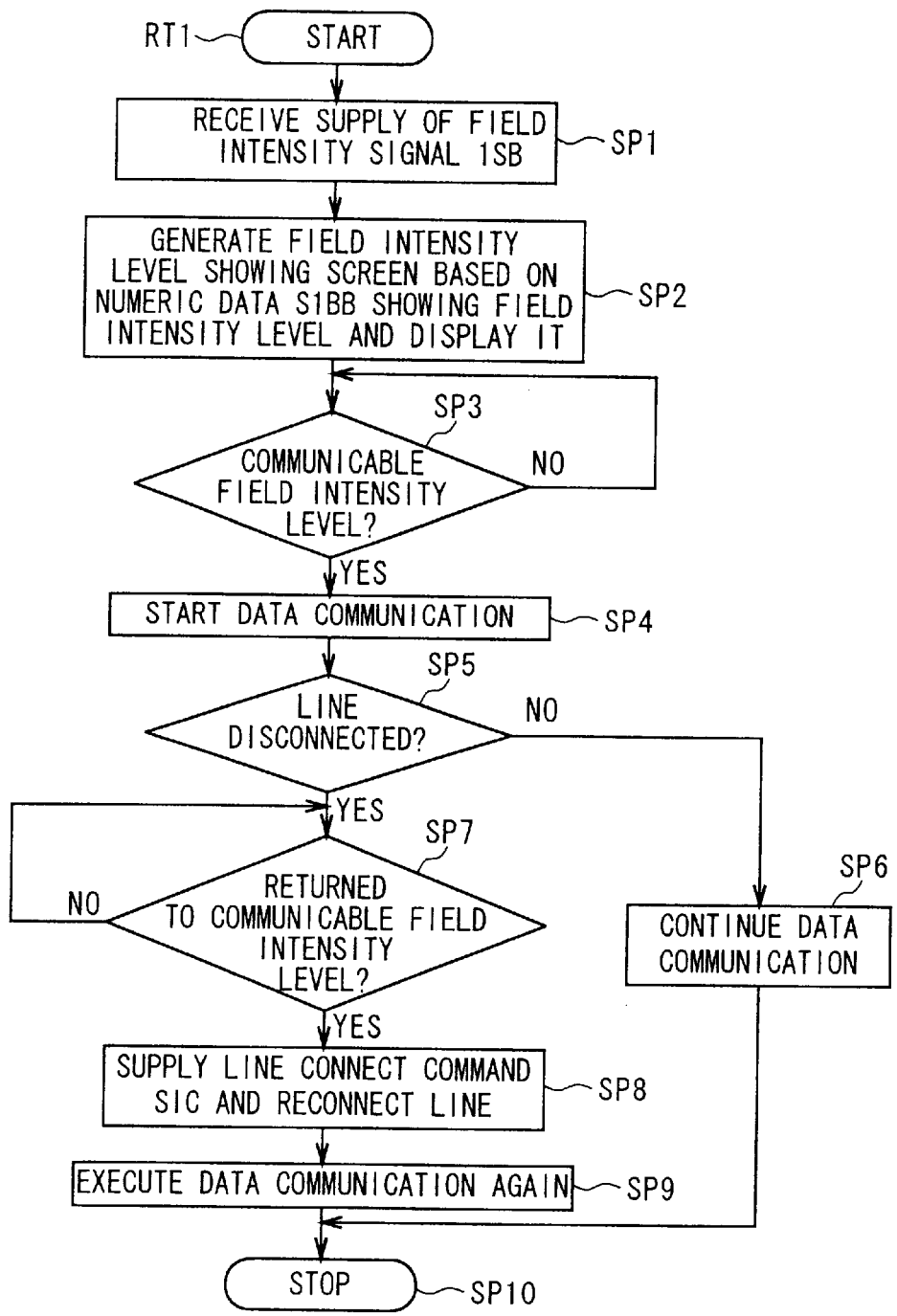
FIG. 8 is a flowchart showing data communication processing procedure according to field intensity level.

That is, as shown in FIG. 8, the main body of notebook computer 1A enters processing from a starting step of routine RT1 and goes to step SP1. In step SP1, the CPU 50 receives the field intensity signal S1B supplied from the digital cellular phone 1B by the I/O controller 73, and converting this into the numeral data S1BB, and then, goes to the next step SP2.

In step SP2, the CPU 50 generates the field intensity level showing screen 90 based on the numeral data S1BB showing the field intensity level according to the field intensity display program, displaying this on the liquid crystal display 21 via the video controller 56, and going to the next step SP3.

In step SP3, the CPU 50 determines whether or not communication is possible based on the field intensity level showing screen 90 displayed on the liquid crystal display 21. Here, if a negative result is obtained, it is determined that even if the field intensity level is "within area", for example when the numeral shown in the field intensity level showing screen 90 is "5" or less in the 15 levels, there is a possibility that the field intensity level might be instantaneously deteriorated in the middle of communication and the line might be disconnected, thus, communication is impossible. Thereby, the CPU 50 waits till the field intensity level becomes sufficiently high.

On the contrary, if an affirmative result is obtained in step SP3, it is determined that since the field intensity level is "within area" and the numeral shown in the field intensity level showing screen 90 is for example "9" and over in the 15 levels and it has been continued for a prescribed period of time or more, communication is sufficiently possible. And the CPU 50 goes to the next step SP4.

Since the field intensity level is in a sufficiently communicable state, in step SP4, the CPU 50 connects a line to a desired party via the digital cellular phone 1B according to user's operation and starting data communication. And the CPU 50 goes to the next step SP5.

In step SP5, the CPU 50 determines whether or not the line of the digital cellular phone 1B has disconnected in the middle of the data communication. Here, a phenomenon that the line is disconnected halfway may occur when the field intensity level of the digital cellular phone 1B on receiving has suddenly deteriorated owing to the state change of the transmission line or the like. The CPU 50 recognizes that the line has disconnected by a line disconnection signal to be transmitted from the digital cellular phone 1B when the line has disconnected.

Here, if a negative result is obtained, this means that the line on the digital cellular phone 1B has not been disconnected in the middle of the data communication. At this time, the CPU 50 goes to the next step SP6 to continue the data communication, and then, going to step SP10 and finishing the processing.

On the contrary, if an affirmative result is obtained in step SP5, this means that the line on the digital cellular phone 1B has disconnected in the middle of the data communication. At this time, the CPU 50 goes to the next step SP7.

Since the line on the digital cellular phone 1B has disconnected, in step SP7, the CPU 50 determines whether or not the wave condition has been returned to a communicable field intensity level based on the field intensity signal S1B supplied again from the digital cellular phone 1B in the waiting state.

Here, if a negative result is obtained, this means that the wave condition has not been returned yet to the communicable field intensity level. At this time, the CPU 50 waits till it returns to the communicable field intensity level.

On the contrary, if an affirmative result is obtained in step SP7, this means that the wave condition has been returned to the communicable field intensity level. At this time, the CPU 50 goes to the next step SP8.

In step SP8, the CPU 50 supplies the line connect command S1C to the digital cellular phone 1B and reconnecting a line, and going to the next step SP9.

In step SP9, the CPU 50 executes data communication again via the digital cellular phone 1B, and then goes to step SP10 and finishing the processing.

(7) Operation and Effects of Embodiment

According to the above configuration, the main body of notebook computer 1A generates the field intensity level showing screen 90 to be displayed in the 16 levels based on the field intensity signal S1B that will be supplied while waiting at all times from the digital cellular phone 1B connected via the communication terminal 12 and the connecting cable 1C, and displaying that on the liquid crystal display 21.

Thereby, the main body of notebook computer 1A will be able to show the user the field intensity level showing screen 90 to be displayed in the 16 levels on the liquid crystal display 21. Thus, the present wave condition in the digital cellular phone 1B can be further correctly recognized to the user.

Furthermore, since the main body of notebook computer 1A will connect a line to the digital cellular phone 1B only when the communicating condition is stable as that the field intensity level in the digital cellular phone 1B is the prescribed value and over and it has been continued for the prescribed period of time or more, data communication can be surely executed in the communicating environment in which the wave condition is stable.

According to the above configuration, the main body of notebook computer 1A generates the field intensity level showing screen 90 to be displayed in the 16 levels based on the field intensity signal S1B to be supplied from the digital cellular phone 1B and displays this on the liquid crystal display 21. Thereby, the present wave condition in the digital cellular phone 1B can be further correctly shown to the user and recognized by him/her.

(8) Other Embodiments

In the aforementioned embodiment, it has dealt with the case where the field intensity level showing screen 90 in the 16 levels is generated based on the field intensity signal S1B to be supplied from the digital cellular phone 1B and it is displayed on the liquid crystal display 21. However, the present invention is not only limited to this but also a field intensity level showing screen 90 in various number of levels such as 8 or 32 can be generated based on the field intensity signal S1B and displayed. Also in this case, the same effect as the aforementioned embodiment can be obtained.

In the aforementioned embodiment, it has dealt with the case where the communication terminal 12 and the connecting cable 1C are used as the connecting means for connecting the main body of notebook computer 1A and the digital cellular phone 1B. However, the present invention is not only limited to this but also they can be connected via other various connecting means such as a personal computer (PC) card slot, a PC card interface, etc.

In the aforementioned embodiment, it has dealt with the case where the main body of notebook computer 1A is used as the information processor for displaying the field intensity level of the digital cellular phone 1B. However, the present invention is not only limited to this but also provided that it is an information processor having display means for displaying the field intensity level showing screen 90, it can be applied to a portable information processing terminal such as personal digital assistant (PDA).

Figure 9:
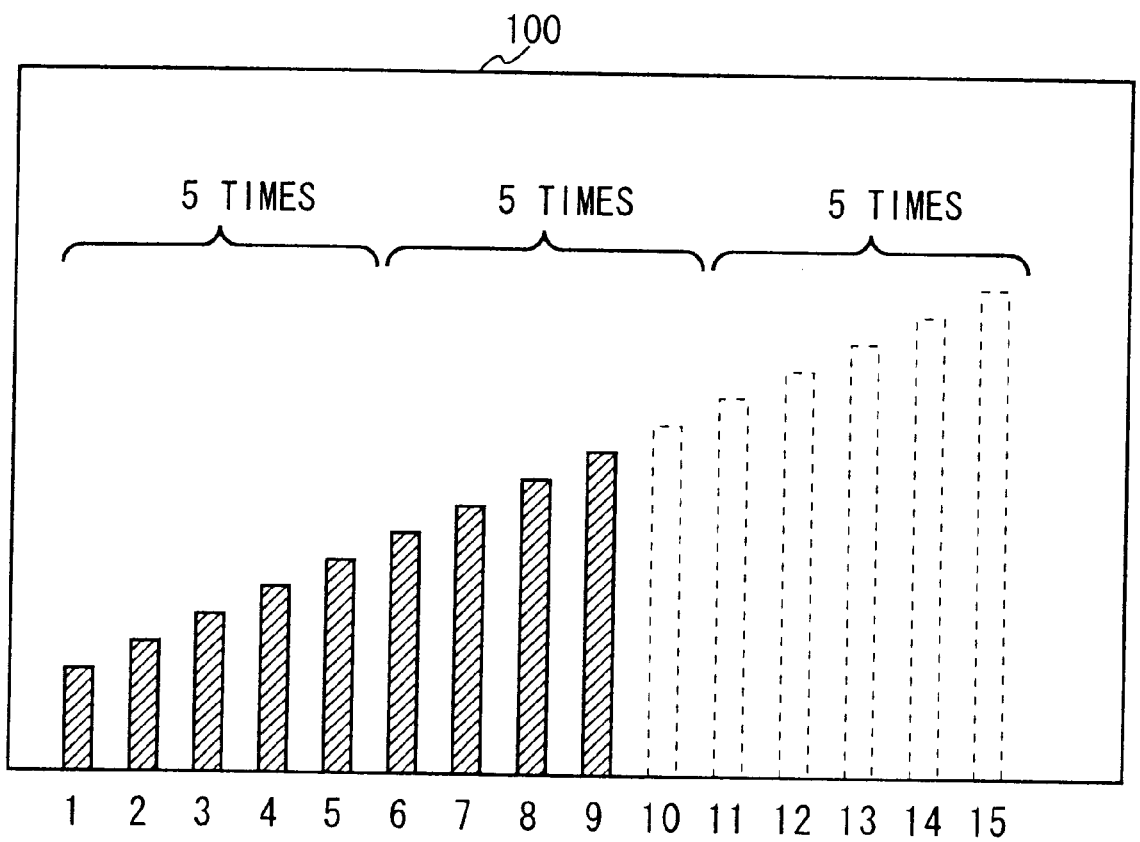
FIG. 9 is a schematic diagram showing a field intensity level showing screen of another embodiment.

In the aforementioned embodiment, it has dealt with the case where the field intensity level showing screen 90 in which the comment content "The present field intensity level is 9." is written is displayed. However, the present invention is not only limited to this but also as shown in FIG. 9, a field intensity level showing screen 100 shown by "bar" set to five times as precise as conventional one can be displayed.

Furthermore, in the aforementioned embodiment, it has dealt with the case where the CPU 50 generates the field intensity level showing screen 90 based on the field intensity signal S1B to be supplied from the digital cellular phone 1B according to the field intensity display program previously stored in the HDD 67 and displaying the above field intensity level showing screen 90 on the liquid crystal display 21. However, the present invention is not only limited to this but also a program storing medium in which the field intensity display program has been stored can be installed in the main body of notebook computer 1A and used.

Such program storing medium that will be used to install the field intensity display program for executing the aforementioned series of processing in the main body of notebook computer 1A and make it executable by the CPU 50 of the above main body of notebook computer 1A is not only limited to package media such as a floppy disk, a compact disc-read only memory (CD-ROM), a digital versatile disc (DVD), etc. It can be accomplished by a semiconductor memory, magneto-optical disc or the like in that the field intensity display program can be temporarily or permanently stored. Besides, as means for storing the field intensity display program in these program storing mediums, also cable or radio communication medium such as a local area network, internet, digital satellite broadcasting, etc. can be used. Also it can be stored by interposing various interface such as a rooter, a modem, etc.

According to the present invention as described above, a field intensity level showing screen to be displayed in plural levels that is finer than a portable communication terminal unit is generated based on a field intensity signal showing the field intensity level of the portable communication terminal unit that will be supplied via connecting means connected to the portable communication terminal unit, and the above field intensity level showing screen is displayed on display means. Thereby, the user can further correctly recognize the communicating condition of the portable communication terminal unit. Thus, if the user performs data communication when the wave condition is stable, the data communication can be surely executed in the stable communication environment in which the line is never disconnected.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information processor comprising:
   connecting means for connecting a portable communication terminal unit;
   field intensity level showing screen generating means for generating a field intensity level showing screen to be displayed in plural levels that is finer than said portable communication terminal unit based on a field intensity signal showing the field intensity level of said portable communication terminal unit to be supplied from said portable communication terminal unit via said connection means; and
   display means for displaying said field intensity level showing screen.

2. The information processor according to claim 1, further comprising:
   providing control means for monitoring said field intensity level of said field intensity signal, and when the above field intensity level is a prescribed level and over and it has been continued for a prescribed period of time or more, connecting a line to a desired party via said portable communication terminal unit.

3. The information processor according to claim 2, wherein said control means automatically reconnects a line to said desired party when said line has been disconnected and then said field intensity level of said field intensity signal to be supplied from said portable communication terminal unit via said connecting means has become to the prescribed level and over and it has been continued for the prescribed period of time or more.

4. An information processing method comprising:
   a field intensity level showing screen generating step of generating a field intensity level showing screen to be displayed in plural levels that is finer than a portable communication terminal unit based on a field intensity signal showing the field intensity level of said portable communication terminal unit to be supplied from said portable communication terminal unit; and
   a display step of displaying said field intensity level showing screen.

5. The information processing method according to claim 4, including;

a line connecting step of monitoring said field intensity level of said field intensity signal, and when the above field intensity level is a prescribed level and over and it has been continued for a prescribed period of time or more, connecting a line to a desired party via said portable communication terminal unit.

6. The information processing method according to claim 5, wherein said line connecting step automatically reconnects a line to said desired party when said line has been disconnected and then said field intensity level of said field intensity signal to be supplied from said portable communication terminal unit in said line connecting step has become to the prescribed level and over and it has been continued for the prescribed period of time or more.

7. A program storing medium for making an information processor execute a program, including:

a field intensity level showing screen generating step of generating a field intensity level showing screen to be displayed in plural levels that is finer than a portable communication terminal unit based on a field intensity signal showing the field intensity level of said portable communication terminal unit to be supplied from said portable communication terminal unit; and a di splay step of displaying said field intensity level showing screen.

8. The program storing medium according to claim 7, including;

a line connecting step of monitoring said field intensity level of said field intensity signal, and when the above field intensity level is a prescribed level and over and it has been continued for a prescribed period of time or more, connecting a line to a desired party via said portable communication terminal unit.

9. The program storing medium according to claim 8, wherein said line connecting step automatically reconnects a line to said desired party when said line has been disconnected and then said field intensity level of said field intensity signal to be supplied from said portable communication terminal unit in said line connecting step has become to the prescribed level and over and it has been continued for the prescribed period of time or more.

* * * * *